US009325504B2

(12) United States Patent
Weiss et al.

(10) Patent No.: US 9,325,504 B2
(45) Date of Patent: Apr. 26, 2016

(54) METHOD FOR SECURE TRANSFER OF AN APPLICATION FROM A SERVER INTO A READING DEVICE UNIT

(75) Inventors: Dieter Weiss, Munich (DE); Gisela Meister, Munich (DE); Jan Eichholz, Munich (DE); Florian Gawlas, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 13/637,835

(22) PCT Filed: Mar. 25, 2011

(86) PCT No.: PCT/EP2011/001525
§ 371 (c)(1),
(2), (4) Date: Sep. 27, 2012

(87) PCT Pub. No.: WO2011/124333
PCT Pub. Date: Oct. 13, 2011

(65) Prior Publication Data
US 2013/0031357 A1   Jan. 31, 2013

(30) Foreign Application Priority Data
Mar. 29, 2010   (DE) .......................... 10 2010 013 202

(51) Int. Cl.
*H04L 29/06*   (2006.01)
*H04L 9/32*    (2006.01)
(52) U.S. Cl.
CPC ............ *H04L 9/3234* (2013.01); *H04L 9/3215* (2013.01); *H04L 2209/805* (2013.01)

(58) Field of Classification Search
CPC ....... G06F 21/00; G06F 21/10; G06F 21/606; G06F 21/602; G06F 3/08; H04L 9/3215; H04L 9/3234; H04L 2209/802
See application file for complete search history.

(56) References Cited

U.S. PATENT DOCUMENTS 6,005,942 A * 12/1999 Chan et al. ................... 713/187
7,124,100 B2   10/2006 Pirillo
(Continued)

FOREIGN PATENT DOCUMENTS

DE   102008047639 A1   3/2010
EP         2136528 A1   12/2009
(Continued)

OTHER PUBLICATIONS

International Search Report for PCT/EP2011/001525, Aug. 30, 2011.
(Continued)

*Primary Examiner* — Michael Pyzocha
(74) *Attorney, Agent, or Firm* — Workman Nydegger

(57) ABSTRACT

A method and a system for secure transfer of an application from a server (S) into a reading device unit (2) with authentication of a user with a data carrier unit (1), the server (S) making available the application, wherein, between the data carrier unit (1) and the server (S), a first cryptographically secured channel (K1) is set up based on first cryptographic information (A), and between a security module (3) of the reading device unit (2) and the server (S) a second cryptographically secured channel (K2) is set up based on second cryptographic information (B). The application is transferred from the server to the reading device unit via the second cryptographically secured channel (K2).

20 Claims, 2 Drawing Sheets

(56) References Cited

U.S. PATENT DOCUMENTS

Figure 1:
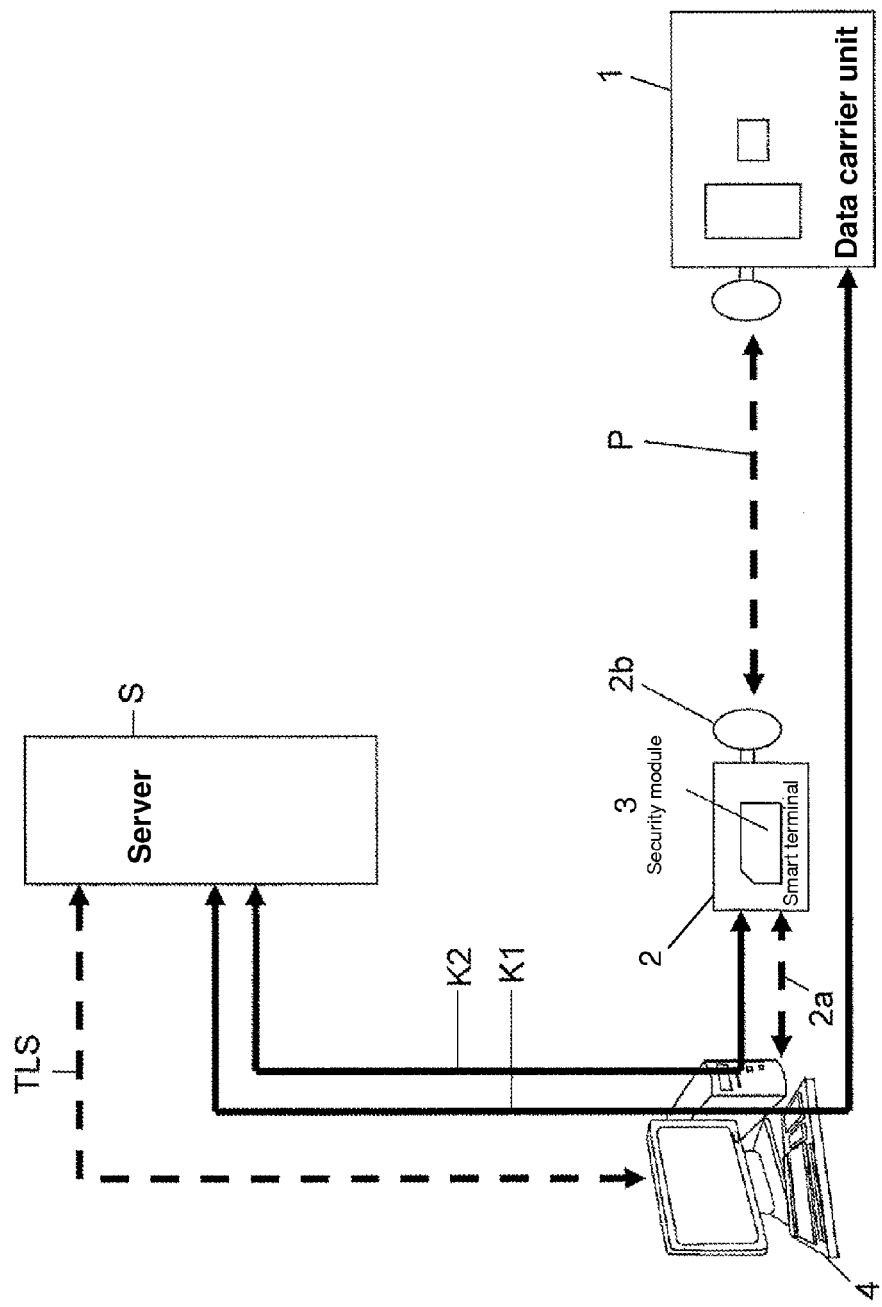

| | | | |
|---|---|---|---|
| 7,433,848 B1* | 10/2008 | Albrecht et al. | 705/73 |
| 2004/0098587 A1* | 5/2004 | Sueyoshi et al. | 713/169 |
| 2005/0138380 A1* | 6/2005 | Fedronic et al. | 713/172 |
| 2005/0207570 A1* | 9/2005 | Yamamoto et al. | 380/28 |
| 2006/0101136 A1* | 5/2006 | Akashika et al. | 709/223 |
| 2006/0219778 A1* | 10/2006 | Komatsu | 235/382 |
| 2007/0090195 A1* | 4/2007 | Kawamura et al. | 235/492 |
| 2007/0223696 A1* | 9/2007 | Furuyama | 380/239 |
| 2008/0073426 A1* | 3/2008 | Koh et al. | 235/380 |
| 2008/0141313 A1* | 6/2008 | Kato et al. | 725/62 |
| 2008/0212495 A1* | 9/2008 | Stirbu | 370/254 |
| 2008/0212771 A1 | 9/2008 | Hauser | |
| 2008/0214242 A1 | 9/2008 | Koraichi et al. | |
| 2009/0100270 A1* | 4/2009 | Ting | 713/186 |
| 2009/0124287 A1 | 5/2009 | Weiss et al. | |
| 2009/0265776 A1* | 10/2009 | Baentsch et al. | 726/9 |
| 2010/0049987 A1* | 2/2010 | Ettorre et al. | 713/186 |
| 2010/0050271 A1* | 2/2010 | Saarisalo | 726/28 |
| 2010/0058064 A1* | 3/2010 | Kirovski et al. | 713/176 |
| 2010/0138666 A1* | 6/2010 | Adams et al. | 713/186 |
| 2010/0211627 A1* | 8/2010 | Roseborough | 709/203 |
| 2010/0230490 A1* | 9/2010 | Guthery | 235/382 |
| 2010/0262825 A1* | 10/2010 | Yoon et al. | 713/169 |
| 2011/0099363 A1* | 4/2011 | Boynton et al. | 713/150 |
| 2011/0131640 A1* | 6/2011 | Canis Robles et al. | 726/7 |
| 2011/0271106 A1* | 11/2011 | Hinkle et al. | 713/168 |
| 2012/0047237 A1* | 2/2012 | Arvidsson et al. | 709/219 |
| 2012/0050046 A1* | 3/2012 | Satorius | 340/573.1 |
| 2013/0178159 A1* | 7/2013 | Xie et al. | 455/41.1 |

FOREIGN PATENT DOCUMENTS

| | | | | |
|---|---|---|---|---|
| EP | 2159762 A1 * | 3/2010 | | G07F 7/10 |
| WO | 2007006535 A1 | 1/2007 | | |
| WO | 2008085917 A2 | 7/2008 | | |

OTHER PUBLICATIONS

IPRP and English Translation of Written Opinion in PCT/EP2011001525, dated Oct. 11, 2012.

* cited by examiner

METHOD FOR SECURE TRANSFER OF AN APPLICATION FROM A SERVER INTO A READING DEVICE UNIT

The invention relates to a method and a system for the method for secure transfer of an application from a server into a reading device unit In many technical areas of application it is desirable to guarantee a secure transfer of an application from a server to a reading device unit with a user's authentication by means of a data carrier unit. For this purpose, a protected communication connection between the data carrier unit and the server or the reading device and the server should be set up.

As a server there is understood in this document an application server which offers applications, so-called e-services. Under e-services there are summarized all the services and activities which are created by means of computers and interactively offered and carried out via electronic media, such as the Internet. The term server in this application is synonymous with the term application server.

Applications to be transferred, which are offered by the e-service, are for example information and educational services such as e-education, e-learning, e-teaching, e-publishing, e-book, e-zine and e-catalogue, procurement, trading and order services such as e-business, e-commerce, e-procurement, e-cash, e-shop, e-intermediary, e-auction, cultural and administrative services such as e-culture, e-government or e-vote, improvements of marketing, product or customer-relationship services, electronic consulting such as e-consult or e-advising.

Preferably, the applications are security-relevant services, production-technical, scientific or logistical services. E-services will be used in many further applications in the future.

Applications to be transferred are understood to be in particular the e-banking, ticketing, VPN and much more, which are made available on the server, for example the server of a bank for carrying out payment transactions, the server of an administrative body for carrying out official matters (tax declaration etc), the server of a linked transport system for the electronic purchase of travel tickets. The kind of server for offering an application, which causes the secure transfer of an application and local installation and utilisation of the application, is not restrictive here.

It is the object of the present invention to guarantee in a simple fashion a secure transfer of such an application and subsequently a secure utilisation of the application on an untrustworthy device. Further, it is an object to personalize the application for a user already before or immediately after the transfer.

This object is achieved by the measures described in the independently equal-ranking claims.

In the method according to the invention, between the data carrier unit and the server a first cryptographically secured channel is set up based on first cryptographic information. Further, between a security module of the reading device unit and the server a second cryptographically secured channel is set up based on second cryptographic information. Finally, the application is transferred from the server to the reading device unit via the second cryptographically secured channel.

For example, such cryptographic information can be access data, passwords, PINs or other secret information.

In a particularly preferred embodiment of the method according to the invention, the data carrier unit negotiates with the server a first cryptographic key via which the first cryptographically secured channel is set up. Analogously, the security module of the reading device unit negotiates with the server a second cryptographic key via which the second cryptographically secured channel is set up. For negotiating the keys, methods known from the prior art can be used. For example, the Diffie-Hellman key exchange can be employed for generating the first and/or second cryptographic key.

The data carrier unit preferably is a portable data carrier, in particular with corresponding security functionalities, such as e.g. smart cards, chip cards, tokens and/or electronic identity documents, such as for example an electronic identity card, passport etc with machine-readable identification data of a person, which data are stored on a chip.

In a further, particularly preferred embodiment of the invention, the data carrier unit is employed with a contactless, for example NFC interface.

The reading device unit is preferably a so-called smart reader. Such reading device units or terminals often contain corresponding security elements or security modules, such as e.g. a secure element or a SAM module (SAM =secure application module). The smart reader is a reading device with a contact-type interface, in particular USB, and a security module located therein. The security module, for example a smart card chip, preferably has a contactless interface for communication with the data carrier unit, so that the contactless interface of the data carrier unit and of the security module is employed for setting up the first cryptographically secured channel.

In an alternative configuration, the reading device unit is a mobile end device, in particular a mobile radio device. In the mobile end device a safety element is integrated here. The security element is configured in particular as a hardware component and arranged as a permanently integrated part in the mobile end device, in this form it either not being possible for said integrated part to be removed from the mobile end device, for example as an M2M module, co-processor or trusted base, or said integrated part being connected as a removable module having security functionality with the mobile end device, for example as a chip card, in particular a subscriber identification module (SIM card), smart card, mass memory card, USB token, multimedia card, secure micro SD card, mobile radio network token, e.g. a UMTS surfstick. Alternatively, the security element is configured as a software component in the form of a trusted platform module as a trustworthy part of the operating system kernel of the mobile end device or as a security software algorithm. The mobile end device is equipped here with communication interfaces to the server and to the data carrier unit.

In a preferred embodiment, the reading device unit is employed with a contact-type interface, the contact-type interface being employed to set up the second cryptographically secured channel.

Preferably, after the transfer of the application the application is installed and managed on the security module of the reading device unit, in particular with Global Platform card management interfaces (GPCS).

Preferably, the application is personalized for the user before the transfer. Thus, the application is personalized already before the installation on the security module, what is achieved on account of the user authentication by means of the data carrier unit.

Alternatively, the application is personalized for the user on the security module of the reading device unit only after the installation of the application.

In a further variant of the method according to the invention, the server is a signature terminal for electronic identity documents, known from the prior art, there being set up via so-called secure messaging the first and/or second cryptographically secured channel between the signature terminal and the first and/or second data carrier units, which respectively are electronic identity documents. Secure messaging is preferably effected based on a password-based transport protocol and particularly preferably based on the PACE protocol, see Technical Guideline TR-03110, "Advanced Security Mechanisms for Machine Readable Travel Documents", version 2.02, BSI, 2009.

Preferably, the reading device unit is incorporated in a data processing device and operational by means of the data processing device. As a data processing device there are to be mentioned PC, notebook, in particular untrustworthy devices. The data processing unit employs a secure data connection, in particular through a transport layer security (TLS), to the server for setting up the first and/or second cryptographically secured channel (K1, K2).

It is further preferred that the reading device unit and in particular the security module are connected via the contact-type interface with the data processing unit, so that the untrustworthy data processing device can be connected via the security module with the server. This makes possible a personalization at any time in a simple fashion even on an insecure data processing device, for example a PC in an Internet café, or a PC whom one does not trust.

In a further embodiment of the method according to the invention, the first cryptographically secured channel is set up directly between the contactless interface of the data carrier unit via the contactless interface of the reading device unit to the server via the data processing device, whereas the second cryptographically secured channel is set up between the contact-type interface of the reading device unit via the data processing device to the server.

Preferably, the application is enabled only by authentication of the user by means of the data carrier unit at the reading device unit, in particular by restricted identification.

Besides the above-described method, the invention further relates to a system of server, data carrier unit and reading device unit, which system is configured such that in the operation of the system the method according to the invention and in particular also one or several preferred variants of this method can be carried out.

Embodiments of the invention will be described in detail hereinafter with reference to the attached Figures.

Figure 2:
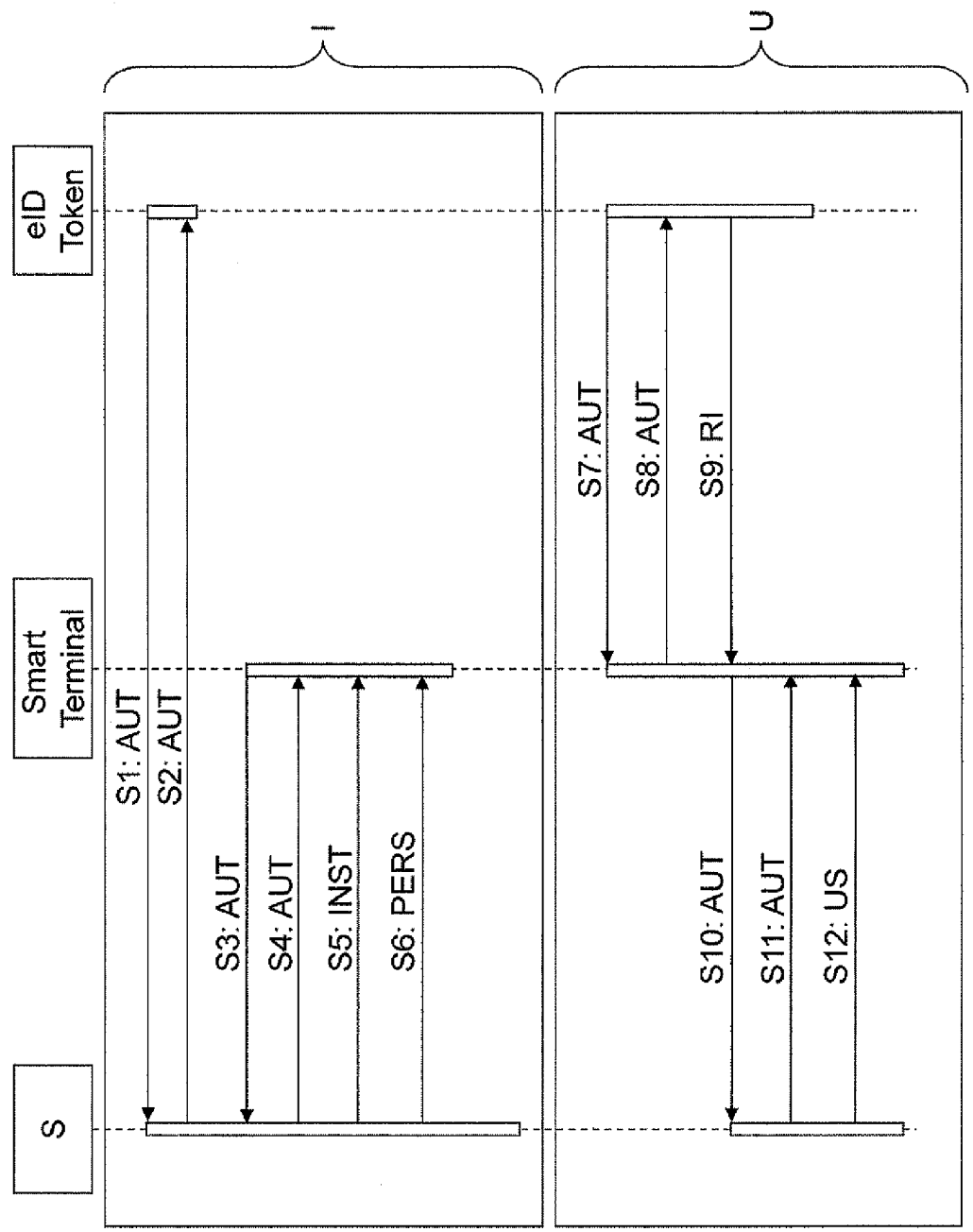

There are shown:

FIG. 1 a first embodiment of a method according to the invention for secure transfer of an application;

FIG. 2 a diagram which illustrates a message exchange carried out in the embodiment of FIG. 1.

FIG. 1 shows a configuration of a method according to the invention, in which the first and second cryptographically secured channel K1 and K2 is utilised for the secure loading of applications. In the variant shown in FIG. 1, the data carrier unit 1 is an eID token, e.g. an electronic identity card. The reading device unit is represented by a so-called smart terminal 2, which has a security module 3 (e.g. a SAM module). The smart terminal has a contact-type interface 2a, for example USB, and a contactless interface 2b. The smart terminal is configured in particular as a smart reader which is integrated via a USB interface in a data carrier processing device 4, for example a notebook. The smart terminal 2 and the eID token 1 can communicate with each other via corresponding interfaces, preferably via NFC interfaces, as indicated by arrow P. Remote from the smart terminal 2, the eID token 1 and the notebook 4 there is arranged a central server S which provides electronic services (so-called e-services). The server S here represents an e-service terminal server, for example a bank server for Internet banking, a tax office server or a trust center, which can communicate via a network with the notebook 4 in the form of a PC. The connection of the server S with the notebook 4 is effected in particular via the Internet, e.g. employing the TLS protocol (TLS =transport layer security). In so doing, between the server S and the smart reader 2, which is connected via its USB interface 2a with a corresponding USB interface of the notebook 4, there is set up an end-to-end-encrypted Internet connection or a VPN connection. The communication between notebook 4 and server S is indicated in FIG. 1 by arrow TLS.

Via this connection there is set up the second cryptographically secured channel K2 between server S and smart reader 2. Moreover, the encrypted connection between server S and smart reader 2 is also employed within the framework of setting up the first cryptographically secured channel K1. Here, the communication is routed via the smart reader 2. The smart reader 2 functions on this occasion as an RFID reading device for the data carrier unit 1. Thus, the first cryptographically secured channel K1 between server S and eID token 1 is set up via the encrypted connection to smart reader 2 and via the contactless interface of the smart reader 2 and the eID token 1. For this purpose, for the individual channels K1 or K2 corresponding keys A and B are negotiated.

In particular, here, a password-based or asymmetric transport protocol (e.g. the PACE protocol known from the prior art) can be employed. There can be generated a key A between server S and eID token 1, which is provided for the encryption of the communication in channel K1. Analogously, with the same mechanism there is generated, within the framework of setting up a second secure channel K2 between smart reader 2 and server S, a second session key B which is provided for the encrypted communication in channel K2. In a preferred variant, upon the generation of the corresponding keys A, B, an identifier is employed, which does not correspond to the identity identifier of the eID token 1 or of the security module 3. Preferably, a so-called restricted ID is used.

Between the eID token 1 and the server S there is thus set up a first cryptographically secured channel, which again is designated as K1. Setting up the connection is effected via secure messaging (designated as SM) and, in so doing, an authentication between the server S and the eID token 1 runs with per se known protocols. Here, the smart terminal 2 can assume an active role in the execution of the protocols. In a preferred variant, here, the smart terminal 2 executes the PACE protocol.

Additionally to the channel K1, there is also established a second cryptographically secured channel K2 between the server S and the smart terminal 2 or the security module 3. In so doing, an authentication is effected between the server S and the security module 3. In analogy to the above-described variant, upon setting up the channels K1 or K2 there was again employed cryptographic information or a cryptographic key A, B. After setting up the second cryptographically secured channel K2, an application in the form of an applet is transferred from the server S via this channel K2 to the security module 3 of the smart terminal 2 and installed there. Subsequently, via the same channel there can be effected a personalization of the applet, for this purpose a corresponding identification of the eID token 1 or corresponding authentication data being employed, which were made available via the first secure channel K1 to the server S. The personalization can optionally be effected at a later point in time, but then there must again be separately set up a secure channel between server S and security module 3.

The installed applet can represent any program and cover various cases of application in the area of e-banking, ticketing and the like. The applet can be installed and managed e.g. with the Global Platform card management interfaces known from the prior art. Within the framework of the later utilisation of the applet, analogous to the methods described above, again a cryptographically secured channel K3 between the smart terminal 2 and the eID token 1 is set up. Further, for the utilisation of the application there can also be set up a secure channel K2 between server S and smart terminal 2. The eID token 1 can again be used in this phase as a user authentication and, optionally, identification against the server S. Further, there is carried out an authentication between the eID token 1 and the installed and personalized application on the smart terminal 2. In particular, the restricted identification of an electronic passport, already mentioned above, can be used to enable the application.

FIG. 2 shows once again a flowchart which illustrates the method steps carried out in the embodiment of FIG. 1. Here, the messages exchanged between eID token 1, smart reader 2 and server S are illustrated. I indicates the installation phase of the applet and U the later employment or utilisation phase. First, in step S1 and S2 the authentication between server S and eID token 1 is effected, which is designated as AUT. Subsequently, in step S3 and S4 the authentication between server S and smart reader 2 or security module 3 is effected, which again is designated as AUT. In step S5, then, the applet from Server S is installed on smart terminal 2 or security module 3. This is designated as INST. Finally, in step S6 a suitable personalization of the applet is effected based on an identity of the eID token 1.

Upon a later utilisation of the applet, there is effected, according to steps S7 and S8, an authentication between eID token 1 and smart reader 2, which again is designated as AUT. Subsequently, in step S9 a restricted identification (designated as RI) of the eID token is transmitted to smart terminal 2. Finally, in step S10 and S11 an authentication of the smart terminal 2 against the server S is effected, which again is indicated by AUT. Via the restricted identification RI there can then be enabled the installed application which is subsequently utilised in step S12, as illustrated by the designation US.

As results from the preceding description, with the embodiment described with reference to FIG. 1 and FIG. 2 a secure loading and installing of an applet on a corresponding smart terminal is achieved. With the employment of a cryptographically secured channel between the eID token 1 and the smart terminal 2, this applet itself can then be employed for insecure devices, such as e.g. notebooks 4. For loading the applet, a first cryptographically secured channel K1 and a second cryptographically secured channel K2 are set up employing corresponding cryptographic information or keys A, B. With this cryptographic information then again an authentication key is specified for setting up a secure channel between smart terminal 2 and eID token 1 in the utilisation phase of the applet.

In a not shown embodiment the reading device unit is a mobile radio device with integrated security element. The security element here is connected with the mobile end device either in the form of an M2M module, co-processor or trusted base or as a removable module having security functionality, for example as a chip card, in particular a subscriber identification module (SIM card), smart card, mass memory card, multimedia card, secure micro SD card.

Alternatively, the security element is configured as a software component in the form of a trusted platform module as a trustworthy part of the operating system kernel of the mobile end device or as a security software algorithm. The mobile end device is equipped here with communication interfaces to the server and to the data carrier unit.

The communication to the server is effected here via a TLS via the mobile radio network, in particular UMTS or GPRS. The connection to the data carrier unit is effected via NFC, RFID or contact-based.

LIST OF REFERENCE NUMBERS 1 data carrier unit
2 smart reader, reading device unit
2a contact-type interface
2b contactless interface
3 SAM module
4 data processing device, notebook
K1, K2 cryptographically secured channels
P contactless communication connection
TLS transport layer security, secure data connection
S server

The invention claimed is:

1. A method for secure transfer of an application from a server into a reading device unit with authentication of a user by means of a data carrier unit, the reading device unit being a smart terminal including a security module, and the data carrier unit including an electronic identity token, the server making available the application to the reading device unit, the method comprising the steps:
setting up between the data carrier unit and the server a first cryptographically secured channel based on first cryptographic information;
setting up between the security module of the reading device unit and the server a second cryptographically secured channel based on second cryptographic information, wherein the security module of the reading device unit is a secure application module (SAM), the second cryptographically secured channel being set up between the security module of the reading device unit and the server after the first cryptographically secured channel is set up between the data carrier unit and the server;
transferring the application from the server to the reading device unit via the second cryptographically secured channel;
installing the application on the security module of the reading device unit; and
managing the application by the security module of the reading device unit,
wherein the reading device unit is incorporated in a data processing device and the data processing device employs a secure data connection, through a transport layer security, to the server for setting up the first cryptographically secured channel or the second cryptographically secured channel.

2. The method according to claim 1, wherein the application is personalized for the user before the transfer.

3. The method according to claim 1, wherein after the installation of the application, the application is personalized for the user on the security module of the reading device.

4. The method according to claim 1, wherein the data carrier unit negotiates with the server a first cryptographic key via which the first cryptographically secured channel is set up, and the reading device unit negotiates with the server a second cryptographic key via which the second cryptographically secured channel is set up.

5. The method according to claim 1, wherein the server is a signature terminal for electronic identity documents and via secure messaging, setting up, based on a password-based protocol, the first cryptographically secured channel or the second cryptographically secured channel between the signature terminal and the data carrier unit, said data carrier unit comprising an electronic identity document.

6. The method according to claim 1, wherein the data carrier unit is used with a contactless interface, the security module of the reading device unit is used with a contactless interface, the contactless interface of the data carrier unit and of the security module being employed for setting up the first cryptographically secured channel.

7. The method according to claim 1, wherein the security module in the reading device unit is used with a contactless interface or the reading device unit moreover is used with a contact-type interface, the contactless-type interface or the contact-type interface being employed for setting up the first cryptographically secured channel or the second cryptographically secured channel.

8. The method according to claim 1, wherein, the data carrier unit is used with a contactless interface, the security module of the reading device unit is used with a contactless interface, the contactless interface of the data carrier unit and of the security module being employed for setting up the first cryptographically secured channel, wherein the reading device unit is incorporated in a data processing device and the data processing device employs a secure data connection, through a transport layer security, to the server for setting up the first cryptographically secured channel or the second cryptographically secured channel.

9. The method according to claim 1, wherein, the security module in the reading device unit is used with a contactless interface or the reading device unit moreover is used with a contact-type interface, the contactless-type interface or the contact-type interface being employed for setting up the first cryptographically secured channel or the second cryptographically secured channel, and wherein the reading device unit and the security module are connected via the contact-type interface with the data processing device.

10. The method according to claim 1, wherein the application is enabled only by authentication of the user by the data carrier unit at the reading device unit by restricted identification.

11. A system comprising: a server, a data carrier, and a reading device, wherein
the reading device is a smart terminal that includes a security module;
the data carrier unit includes an electronic identity token;
the server is configured to make available an application to the reading device unit and
the system is configured so that in the operation of the system:
a first cryptographically is secured channel between a data carrier unit and a server,
the first cryptographically secured channel being based on first cryptographic information for the purpose of the authentication of a user by the data carrier unit at the server;
a second cryptographically is secured channel between a security module of a reading device unit and the server, the second cryptographically secured channel being based on second cryptographic information and the security module of the reading device unit being a secure application module (SAM)), the second cryptographically secured channel being set up between the security module of the reading device unit and the server after the first cryptographically secured channel is set up between the data carrier unit and the server; wherein
the application is transferred from the server to the reading device unit via the second cryptographically secured channel,
the application, after the transfer, is installed and managed on the security module of the reading device unit; and
the reading device unit is incorporated in a data processing device and the data processing device employs a secure data connection, through a transport layer security, to the server for setting up the first cryptographically secured channel or the second cryptographically secured channel.

12. The system according to claim 11, wherein the system is configured to carry out a method comprising the steps of:
setting up between the data carrier unit and the server a first cryptographically secured channel based on first cryptographic information;
setting up between a security module of the reading device unit and the server a second cryptographically secured channel based on second cryptographic information;
transferring the application from the server to the reading device unit via the second cryptographically secured channel;
installing the application on the security module of the reading device unit; and
managing the application by the security module of the reading device unit.

13. The system according to claim 11, wherein the application is personalized for the user before the transfer.

14. The system according to claim 11, wherein after the installation of the application, the application is personalized for the user on the security module of the reading device.

15. The system according to claim 11, wherein the data carrier unit is configured to negotiate with the server a first cryptographic key via which the first cryptographically secured channel is set up, and the reading device unit negotiates with the server a second cryptographic key via which the second cryptographically secured channel is set up.

16. The system according to claim 11, wherein the server is a signature terminal for electronic identity documents and via secure messaging, setting up, based on a password-based protocol, the first cryptographically secured channel or the second cryptographically secured channel between the signature terminal and the data carrier unit, said data carrier unit comprising an electronic identity document.

17. The system according to claim 11, wherein the data carrier unit is used with a contactless interface, the security module of the reading device unit is used with a contactless interface, the contactless interface of the data carrier unit and of the security module being employed for setting up the first cryptographically secured channel.

18. The system according to claim 11, wherein the security module in the reading device unit is used with a contactless interface or the reading device unit moreover is used with a contact-type interface, the contactless-type interface or the contact-type interface being employed for setting up the first cryptographically secured channel or the second cryptographically secured channel.

19. The system according to claim 11, wherein, the data carrier unit is used with a contactless interface, the security module of the reading device unit is used with a contactless interface, the contactless interface of the data carrier unit and of the security module being employed for setting up the first cryptographically secured channel, wherein the reading device unit is incorporated in a data processing device and the data processing device employs a secure data connection, through a transport layer security, to the server for setting up the first cryptographically secured channel or the second cryptographically secured channel.

20. The system according to claim 11, wherein, the security module in the reading device unit is used with a contactless interface or the reading device unit moreover is used with a contact-type interface, the contactless-type interface or the contact-type interface being employed for setting up the first cryptographically secured channel or the second cryptographically secured channel, and wherein the reading device unit and the security module are connected via the contact-type interface with the data processing device.

* * * * *